United States Patent [19]

Chesnutt et al.

[11] Patent Number: 5,661,402

[45] Date of Patent: Aug. 26, 1997

[54] SEALED MODULAR DOWNHOLE ANTENNA

[75] Inventors: Dennis Patrick Chesnutt; Kenneth Howard Hamlin, both of Houston; Paul Lincoln Sinclair, Clear Lake Shores, all of Tex.

[73] Assignee: Halliburton Energy Services, Inc.

[21] Appl. No.: 632,646

[22] Filed: Apr. 15, 1996

Related U.S. Application Data

[63] Continuation of Ser. No. 220,792, Mar. 31, 1994, abandoned.

[51] Int. Cl.$^6$ ............................. G01V 3/28; H01Q 7/04
[52] U.S. Cl. ............................. 324/338; 343/842
[58] Field of Search ............................. 324/323–346; 343/719, 872, 873, 842

[56] References Cited

U.S. PATENT DOCUMENTS

| | | | |
|---|---|---|---|
| 4,373,163 | 2/1983 | Vandebult | 343/842 X |
| 4,739,272 | 4/1988 | Griffin et al. | 324/339 X |
| 5,157,331 | 10/1992 | Smith | 324/338 X |
| 5,212,495 | 5/1993 | Winkel et al. | 324/338 X |
| 5,363,113 | 11/1994 | Mametsa et al. | 343/842 X |
| 5,402,068 | 3/1995 | Meador et al. | 324/338 |

*Primary Examiner*—Sandra L. O'Shea
*Assistant Examiner*—Roger C. Phillips

[57] ABSTRACT

A sealed, modular downhole antenna for measuring electrical characteristics of wellbore fluids and formations. An antenna includes a thin-walled curved metal tube, which houses coil of a length of conductive wire. The wire may be insulated by an insulating coating, as well as a filler that resides in the tube. The tube includes a coupling gap, to facilitate coupling electromagnetic energy through the tube, to and from the conductive wire. The tube also has a wall opening, for ends of the wire to attach to an adapter-connector. The adapter-connector includes suitable features for modular connection to an electrical cable, electrical connectors, or other electrical equipment. Features of the invention may be provided to ensure that such connection is resistive to the high pressures that are often encountered downhole. In this respect, the tube may be also coated with a sealant layer, to hermetically seal the tube, coupling gap, and junction between the adapter-connector and the tube. The sealant layer may include features to facilitate locking engagement with complimentarily sized attributes of a downhole tool.

33 Claims, 6 Drawing Sheets

SEALED MODULAR DOWNHOLE ANTENNA

This application is a continuation of U.S. application Ser. No. 08/220,792, filed Mar. 31, 1994, now abandoned.

BACKGROUND OF INVENTION

1. Field of Invention

The present invention generally relates to logging systems, especially systems that employ downhole antennas. More specifically, the invention concerns a sealed, modular antenna for measuring electrical characteristics of wellbore fluids and formations. The invention also concerns a method of making such an antenna and an antenna assembly.

2. Description of Related Art

Many downhole operations already use antennas for various purposes. For instance, electrical antennas are employed in downhole wireline logging tools to measure the electrical resistivity of wellbore fluids or formation materials. Additionally, antennas are sometimes employed in measurement-while-drilling ("MWD") and logging-while-drilling ("LWD") applications.

Figure 1:
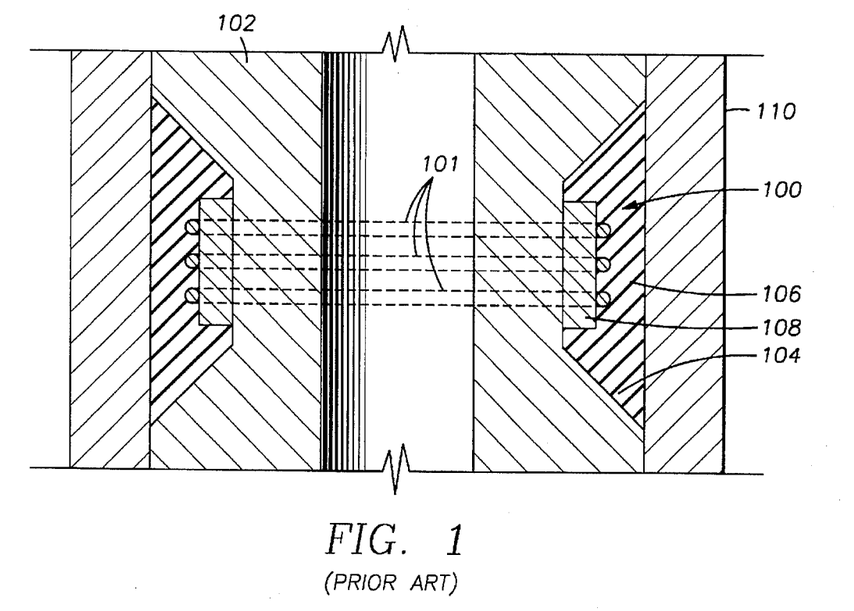
FIG. 1 is a side cross-sectional diagram of a known downhole tool employing a known antenna.

Referring to FIG. 1, downhole antennas have usually taken the form of one or more coils 101 of wire 100, wrapped around a long, narrow, cylindrical mandrel 102. The wire 100 may comprise a length of copper or other suitable conductive material. The ends (not shown) of the wire 100 are usually connected to coaxial cables directly or through hermetic connectors (not shown). The coaxial cables carry electrical signals from the wire 100 to electrical equipment that may be contained within the mandrel 102 or within a section of a downhole string. The mandrel 102 may be part of a drilling string (not shown), a production string, a wireline assembly, or the like. In some applications, wellbore fluids such as drilling mud flow through a central cavity in the mandrel 102. Mandrels are typically made of steel or steel alloys.

The mandrel 102 typically has defined therein a number of annular grooves 104, wherein each groove is wrapped with an insulating, dielectric material 108, such as fiberglass. The coils 101 are wound about the dielectric material 108, and sealed from fluids with an insulating filler 106, such as rubber. The mandrel 102 is sometimes encased by a sleeve 110, which typically comprises a non-conductive, hollow cylindrical sleeve or a slotted metal cylindrical sleeve. The sleeve 110 protects the coils 101 and the filler 106 from damage.

Although many people find the above-mentioned arrangement to be satisfactory for their purposes, this arrangement is not as useful as some might like for their applications. For instance, when the coils 101 are wound around the mandrel 102, they might be inadvertently crossed, thereby electrically shorting one or more coils 101. Another potential problem is that coils 101 of the antenna sometimes electrically short due to moisture invasion, which may occur if wellbore fluids penetrate the sleeve 110 and the filler 106. Moreover, a break or separation may develop in one of the coils 101 under certain circumstances.

These problems cannot be remedied without removing the filler 106, the dielectric material 108, and the wire 100. This is typically a laborious process. In particular, the filler 106 and the dielectric material 108 must be extracted, as well as one or more coils 101. In many cases, the entire wire 100 is removed by a machine and discarded. After the old wire is disconnected from its coaxial cable or hermetic connectors, a new layer of dielectric material is placed around the mandrel, the new wire is connected to the coaxial cable or hermetic connectors, and the coils of the new wire are wound around the new dielectric layer.

SUMMARY OF INVENTION

The present invention in one broad aspect concerns a sealed, modular downhole antenna for measuring electrical characteristics of wellbore fluids and formations. The antenna includes a thin-walled curved metal tube, which houses a coiled length of conductive wire. The wire is preferably insulated, and additional insulation between coils may be provided by a filler that resides in the tube. The tube includes a coupling gap to aid in coupling electromagnetic energy to or from the conductive wire through the tube. The tube also has a wall opening, for ends of the wire to pass through and attach to an adapter-connector. The adapter-connector includes suitable features for modular connection to coaxial cables, downhole electronics, or other electrical equipment. The tube is preferably covered with a sealant layer to hermetically seal the tube, the coupling gap, and the junction between the adapter-connector and the tube. The sealant layer may include features to assist in lockingly engaging the antenna with complementarily shaped features of a downhole tool.

The present invention is especially beneficial to its users since it may be quickly and conveniently replaced, for example, if the antenna is damaged, or if the user decides to use a different number of coils. The antenna of the invention is especially reliable under the extreme pressures and temperatures often encountered downhole, since its coils are hermetically sealed, and since its tube is filled with a pressure resistant filler. Moreover, the antenna is beneficial since its adapter-connector may be easily connected and disconnected to and from cables, connectors, or downhole electronic equipment.

BRIEF DESCRIPTION OF DRAWINGS

The nature, objects, and advantages of the invention will become more apparent to those skilled in the art after considering the following detailed description in connection with the accompanying drawings, in which like reference numerals designate like parts throughout, wherein.

DESCRIPTION OF A PREFERRED EMBODIMENT

Structure

Figure 2:
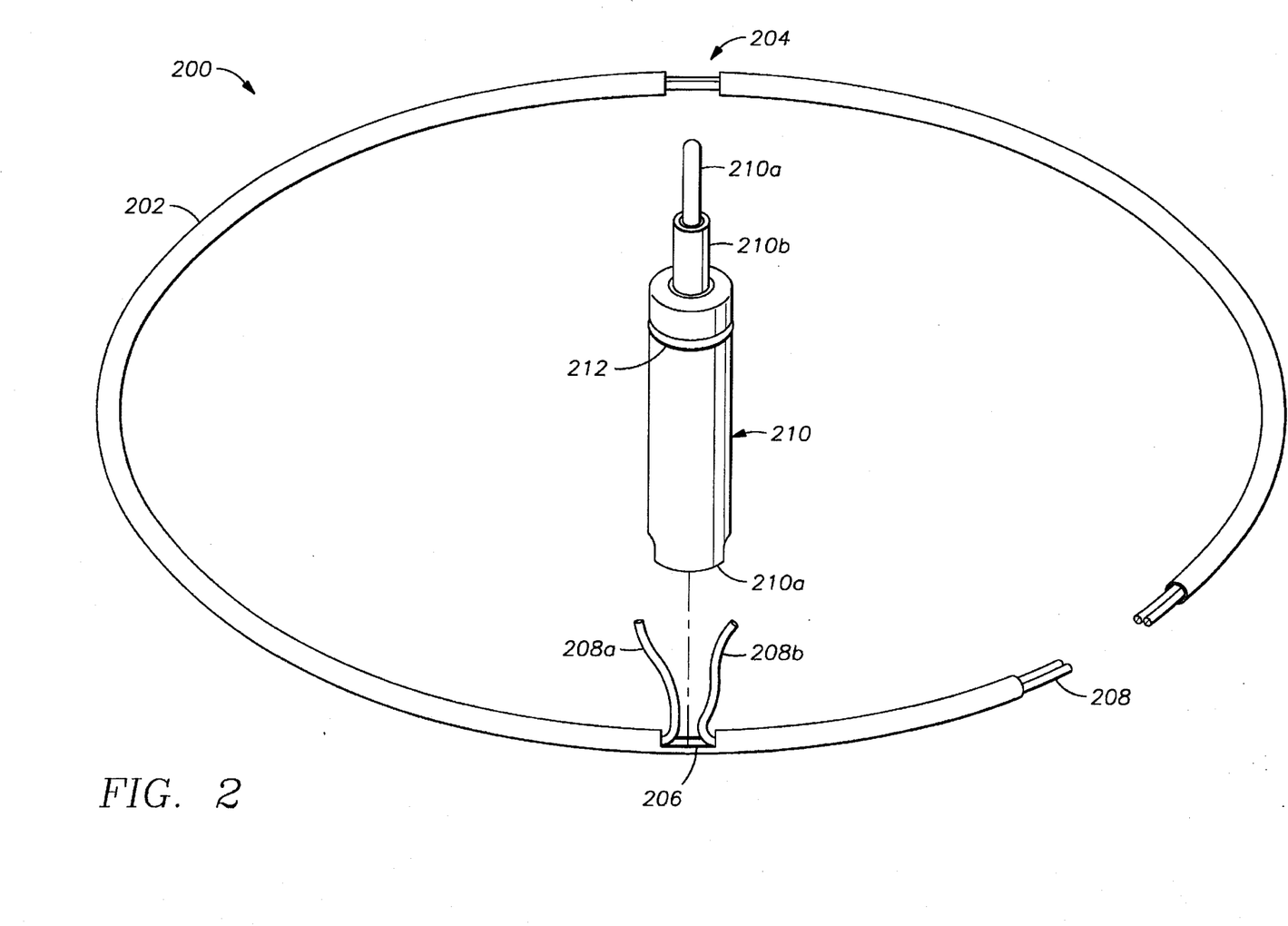
FIG. 2 is an exploded, partially cutaway isometric diagram of an antenna 200, in accordance with the invention.

In an illustrative implementation of the invention, an antenna 200 is provided for transmitting and/or receiving electrical signals for the purpose of conducting downhole measurements in a well (FIG. 2). The antenna 200 includes a thin-walled, curved tube 202. The tube 202 preferably comprises a conductive, non-magnetic material to provide effective electrical shielding for the wire 208. One example of such a material is stainless steel grade 316. However, the tube 202 may be made from a variety of conductive or non-conductive materials, such as copper or another suitably rigid material.

The tube 202 houses one or more coils of a continuous length of conductive wire 208, wherein the length of wire 208 includes two ends 208a–b. The wire 208 may be manufactured from a conductive material such as pure copper, "magnet wire" such as that used in electromagnets, a copper alloy such as beryllium copper or "copper weld", or another suitable material. As an example, the wire 208 may be of 22 gauge size with 2 turns, or 24 gauge size with 10 turns. The wire 208 is preferably coated with an insulating material (not shown) that may comprise, for example, a polyamide material such as Kapton™ (trademark of E.I. DuPont de Nemours & Co.).

The tube 202 defines a coupling gap 204, which comprises a complete break in the continuity of the tube 202, to facilitate the coupling of electromagnetic signals through the tube 202, to or from the coiled wire 208. In a preferred embodiment, the tube 202 may comprise a length of tubing with two ends, curved or bent to position the ends proximate each other, thereby defining the coupling gap 204. Although the tube 202 is preferably curved to form a circular shape, other shapes are also contemplated, such as elliptical.

In an alternate embodiment, the tube 202 may comprise multiple mini-lengths of tubing, which collectively take the desired shape of the antenna, and define multiple coupling gaps. Although, as described above, multiple coupling gaps may be used, one coupling gap is sufficient to facilitate coupling of signals through the tube 202 for most applications.

The tube 202 also defines a wall opening 206. The wall opening 206 provides a location for ends 208a–b of the wire 208 to exit the tube 202 and attach to an adapter-connector 210, which is joined to the tube 202 about the wall opening 206. The wall opening 206 preferably comprises a small hole in the tube 202, which may be positioned at nearly any location on the tube 202 relative to the coupling gap 204. The adapter-connector 210 is, in an exemplary embodiment, constructed from a material that may be strongly welded or brazed to the tube, such as stainless steel or a corrosion resistant alloy of nickel and chromium such as Inconel™ (trademark of Huntington Alloys, Inc.). The adaptor-connector 210 preferably includes a surface 210a that is preferably curved or otherwise shaped to complementarily fit the section of tube 202 surrounding the wall opening 206. The adapter-connector 210 provides a fixture to electrically connect the antenna 200 to equipment such as coaxial cables or downhole electronic equipment.

The adapter-connector 210 may, in an illustrative embodiment, include a coaxial connector that includes an arrangement such as an inner pin 210a and an outer band 210b, or parallel pins (not shown). One end of the wire 208 may be electrically connected to the inner pin 210a, with the other end of the wire 208 being electrically connected to the outer band 210b. The adapter-connector 210 preferably also includes a high-pressure-resistant seal 212 suitable for sealing the adapter-connector 210 to a mating connector (not shown). In a preferred embodiment, an o-ring seal is used, but other devices may be employed, such as a metal-to-metal seal, a "t-seal" or another suitable sealing device.

ASSEMBLY

To assemble the illustrative antenna 200 of the invention, the tube 202 is bent to provide the desired radius of curvature. The tube is bent such that the tube's ends are proximate each other, spaced appropriately to create the desired coupling gap 204. The wall opening 206 may be defined in the tube 202 before or after the bending. The wire ends 208a–b are fed through the tube 202 until the proper number of turns are achieved. Then, the wire ends 208a–b are preferably welded or brazed to the appropriate components of the adapter-connector 210, and the adapter-connector 210 is then welded or brazed to the tube 202.

Next, the tube 202 is vacuum-filled with a filler (not shown) to help insulate the coils of the wire 208 from each other and the tube 202, and to provide internal support for the thin-walled tube 202 during applications where the tube 202 is under high pressure. The filler preferably comprises epoxy, or another suitable non-conductive material of suitably low viscosity to facilitate injection of the filler into the tube 202. After the filler is injected, it is cured and hardened.

Figure 4:
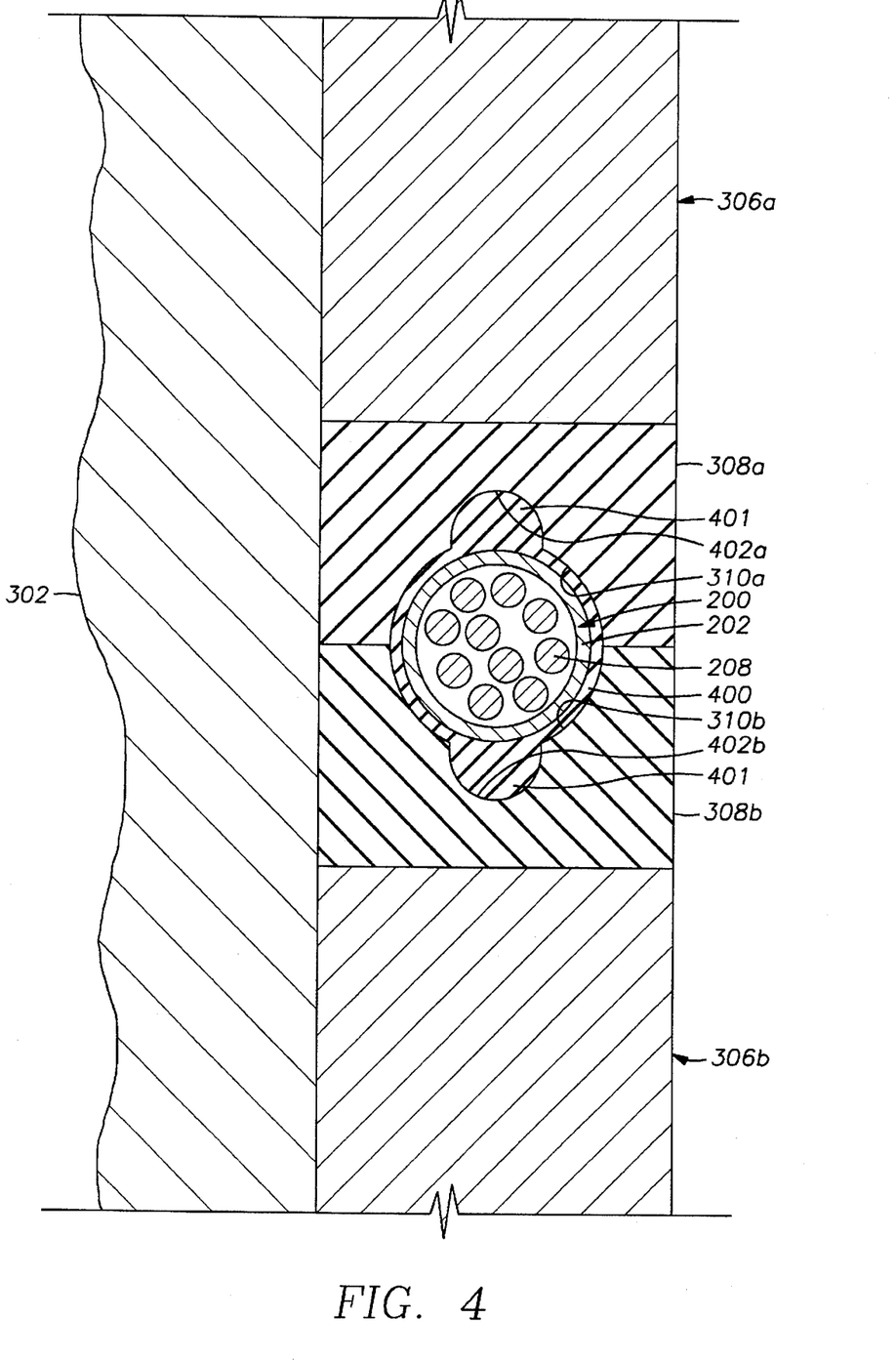
FIG. 4 is a cross-sectional side view of the antenna 200 in locking engagement with a downhole tool, in accordance with the invention.

Although fillers such as epoxy may initially seal and thereby protect the wire 208, some materials may become somewhat brittle with age, decreasing their ability to protect the wire 208 from problems such as moisture invasion. Therefore, the tube 202 is preferably coated with a hermetic sealant layer 400 (FIG. 4). In an exemplary embodiment, the sealant layer may comprise rubber or plastic molding, a glass sealing material, a ceramic sealing material, a corrosion and heat resistant elastomer such as Viton™ (trademark of E.I. DuPont de Nemours & Co.) or Nitrol™ (Monsanto Company), highly saturated nitryl butyl ("HNBR") grade rubber, neoprene, epichlorohydrin, or another suitable sealant.

TOOL CONFIGURATION

Figure 3:
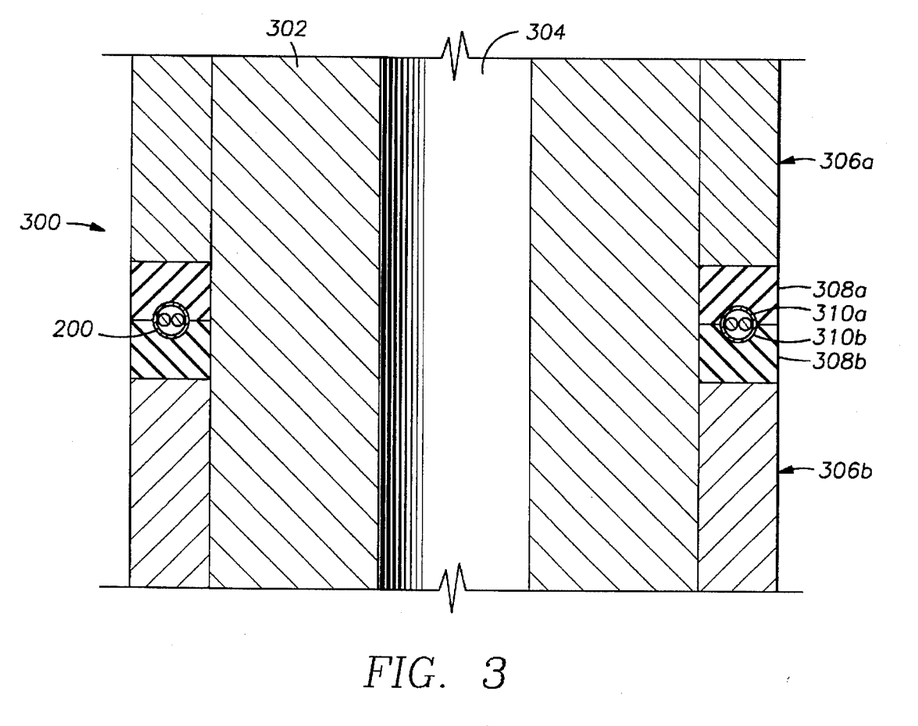
FIG. 3 is a cross-sectional side view of a tool 300 for use with the antenna 200, in accordance with the invention.

To employ the antenna 200 downhole, a modified tool configuration is used. As depicted in FIG. 3, the modified tool 300 includes a long, narrow, cylindrical mandrel 302. The mandrel 302 may include a central cavity 304 for wellbore fluids to flow. The tool 300 also includes sleeve sections that concentrically sheath the mandrel 302. In the present example, two sleeve sections 306a–b are shown, although more may be used in practicing the invention. The sleeve sections 306a–b include respective non-conductive rings or lips 308a–b, having defined therein grooves 310a–b to receive the antenna 200. The lips 308a–b operate to receive and tightly hold the antenna 200 between the grooves 310a–b when the sleeve sections 306a–b are brought together. The lips 308a–b preferably comprise a non-conductive material such as fiberglass.

The sleeve sections 306a–b, in an illustrative embodiment, include threads, channels, or other connecting features (not shown) to inter-engage corresponding features (not shown) of the mandrel 302. In an illustrative embodiment, the mandrel 302 may be removably connected to upper and lower adjacent mandrels (not shown), via upper and lower "connector subs" (not shown). With this arrangement, an antenna 200 may be conveniently replaced by (1) separating the adjoining sleeve sections 306a–b, (2) disconnecting the mandrel 302 from either one of its adjacent connector subs to expose a free end of the mandrel 302, and (3) sliding the antenna 200 over the mandrel's free end, along with one or both of the sleeves 306a–b and lips 308a–b. A replacement antenna may easily be installed simply by reversing these steps.

In a preferred embodiment of the invention (FIG. 4), the sealant layer 400 may be shaped to form curved ridges 401, and the lips 308a–b may include complementarily sized sub-grooves 402a–b to receive the ridges 401. Hence, when the lips 308a–b are urged together, the antenna 200 is locked therebetween. In an alternate embodiment, the sealant layer 400 may be provided with indentations (not shown) to receive protrusions (not shown) of the lips 308a–b, to lockingly engage the antenna 200.

Figure 5:
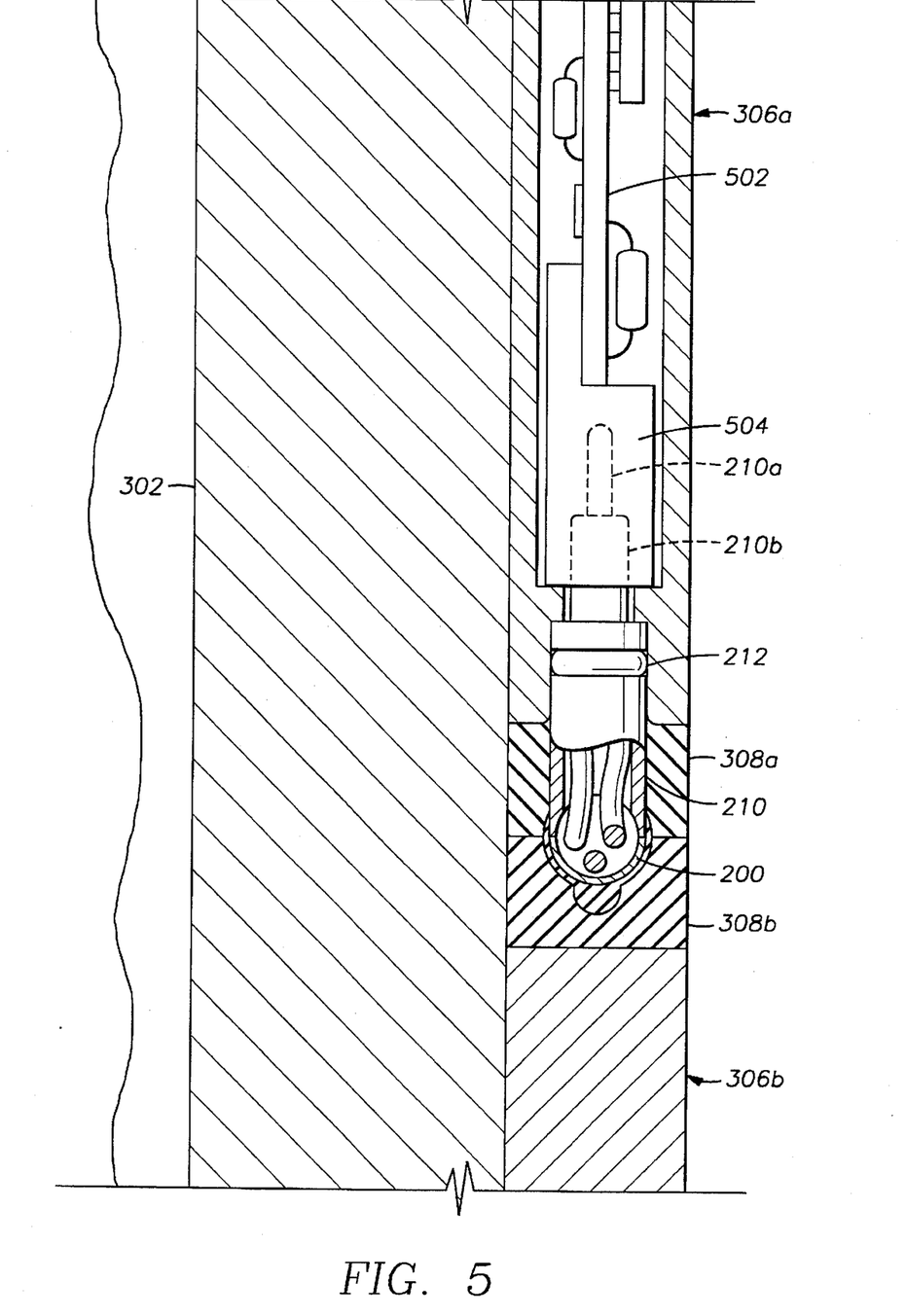
FIG. 5 is a cross-sectional side view of the tool 300 and the antenna 200, illustrating the connection of the antenna 200 to downhole electronics 502.

In an illustrative embodiment of the invention (FIG. 5), the antenna 200 is connected to downhole electronic circuitry 502 by electrically connecting the adapter-connector 210 to a mating connector 504. The mating connector 504 may be rigidly mounted within the sleeve section 306a, in a suitable position to easily receive and electrically connect to the adapter-connector 210. The electronic circuitry 502 may operate to produce or decode electrical signals that are transmitted or received by the antenna 200, in a manner that is known to those skilled in the art. Although the circuitry 502 may be located in one of the sleeve sections 306a–b (as shown in FIG. 5), then circuitry 302 may alternatively be located within the mandrel 302.

Alternatively, the mating connector 504 may be electrically connected to a cable (not shown), such as a coaxial cable, to relay signals between the antenna 200 and remotely located equipment, such as equipment in another mandrel or downhole tool, or equipment located at the surface. For example, such cable may run into an inner conduit (not shown) defined in the mandrel 302, via an axial hole (not shown) defined between the conduit and the mating connector 504. Such cable routing may be performed, for example, in accordance with techniques that are well-known in the art. Preferably, the axial hole includes a sealing connector that is resistant to high pressure, to prevent downhole fluids from penetrating into the inner conduit.

ALTERNATIVE TOOL CONFIGURATION

Figure 6:
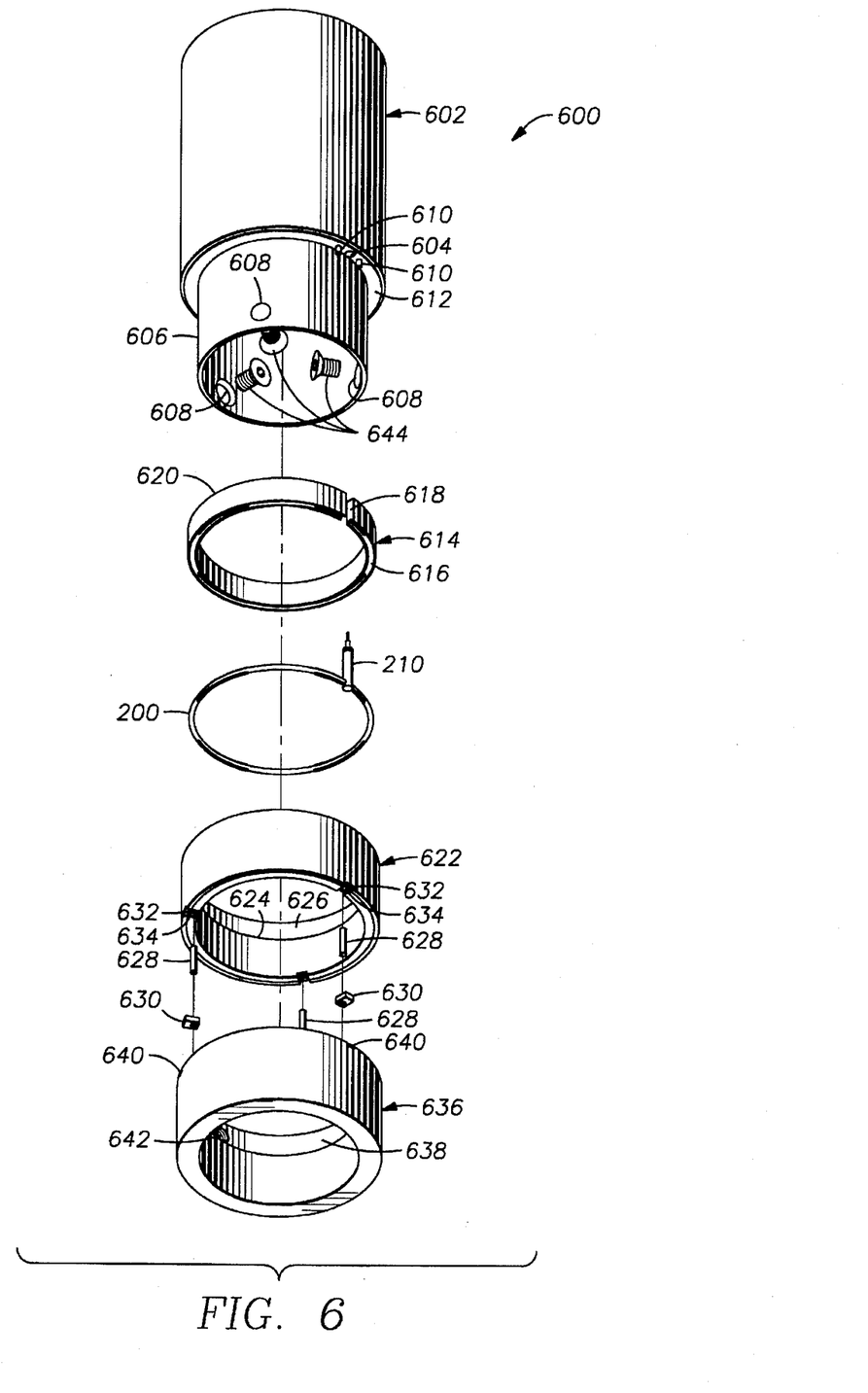
FIG. 6 is an exploded perspective view of an exemplary antenna assembly 600, in accordance with the invention.

In accordance with another aspect of the invention, the antenna 200 may be positioned downhole using a more intricate tool configuration, such as the antenna assembly 600 of FIG. 6. The antenna assembly 600 generally comprises a number of interconnecting annular members that are secured around a mandrel (not shown). In particular, the assembly 600 includes an annular antenna body 602, which serves as a base for other members of the assembly 600. The antenna body 602 may be manufactured from non-magnetic materials such as stainless steel grade 100 (commonly called "NMS-100"). The antenna body 602 includes a mating connector 604, sized and positioned to easily receive and electrically connect to the adapter-connector 210, as described below. In a preferred embodiment, the mating connector 604 is electrically coupled to an electronic circuit (not shown) housed within the antenna body 602. Alternatively, the mating connector 604 may be electrically coupled to a cable (not shown), such as a coaxial cable, to relay signals between the antenna 200 and remotely located equipment, such as equipment in another mandrel or downhole tool, or equipment located at the surface.

The antenna body 602 also includes a recessed flange 606, which defines screw holes 608, the purpose of which are described below. At the base of the flange 606, a number of dowel pins 610 (some not shown) are rigidly mounted to an upper edge 612 of the body 602.

The assembly 600 also includes an annular lower lip 614, which defines a groove 616 to receive the antenna 200, and a gap 618 to receive the adapter-connector 210. The lower lip 614 preferably comprises a non-conductive material such as fiberglass. The groove 616 may further define sub-grooves or protrusions to engage complementarily shaped external features of the antenna 200, such as those described above. The inner diameter of the lower lip 614 is sized to permit the lip 614 to slide over the flange 606. In this position, the lower lip 614 is prevented from rotating by the dowel pins 610, which protrude into a corresponding number of apertures (not shown) in a lower surface 620 of the lip 614.

The assembly 600 further includes an annular upper lip 622 whose inner diameter permits the lip 622 to slide over the flange 606. The upper lip 622 defines a recessed annulus 626 so that, when the upper lip 622 slides over the flange 606, the flange 606 and the upper lip 622 firmly engage the lower lip 614 therebetween. The recessed annulus 626 defines an edge 624 having a groove (not shown) to receive the antenna 200. This groove, like the groove 616, may include sub-grooves or protrusions to engage complementarily shaped external features of the antenna. Hence, when the lower lip 614 is engaged between the upper lip 622 and the flange 606, the antenna 200 is firmly seated between the grooves of the lips 614, 622. The upper lip 622, like the lower lip 614, preferably comprises a non-conductive material such as fiberglass.

The upper lip 622 is prevented from rotating by dowel pins 628 and locking inserts 630, which protrude into corresponding apertures 632 and slots 634, respectively. The dowel pins 628 further serve to secure the locking inserts 630 in place, within the slots 634.

An annular end ring 636 is also included in the assembly 600. When the end ring 636 is slid over the end of the recessed flange 606, the flange 606 resides in an annular recess 638 of the end ring 636. In an illustrative embodiment, the end ring 636 may comprise a non-magnetic material such as NMS-100. The end ring 636 includes apertures (not shown) and slots 640 (some not shown) to receive the dowel pins 628 and locking inserts 630, respectively, which prevent the end ring 636 from rotating relative to the upper lip 622. The end ring 636 also includes threaded screw holes 642 (some not shown) to receive screws 644 via the flange 606, and thereby prevent the end ring 636 from rotating relative to the antenna body 602.

Figure 7:
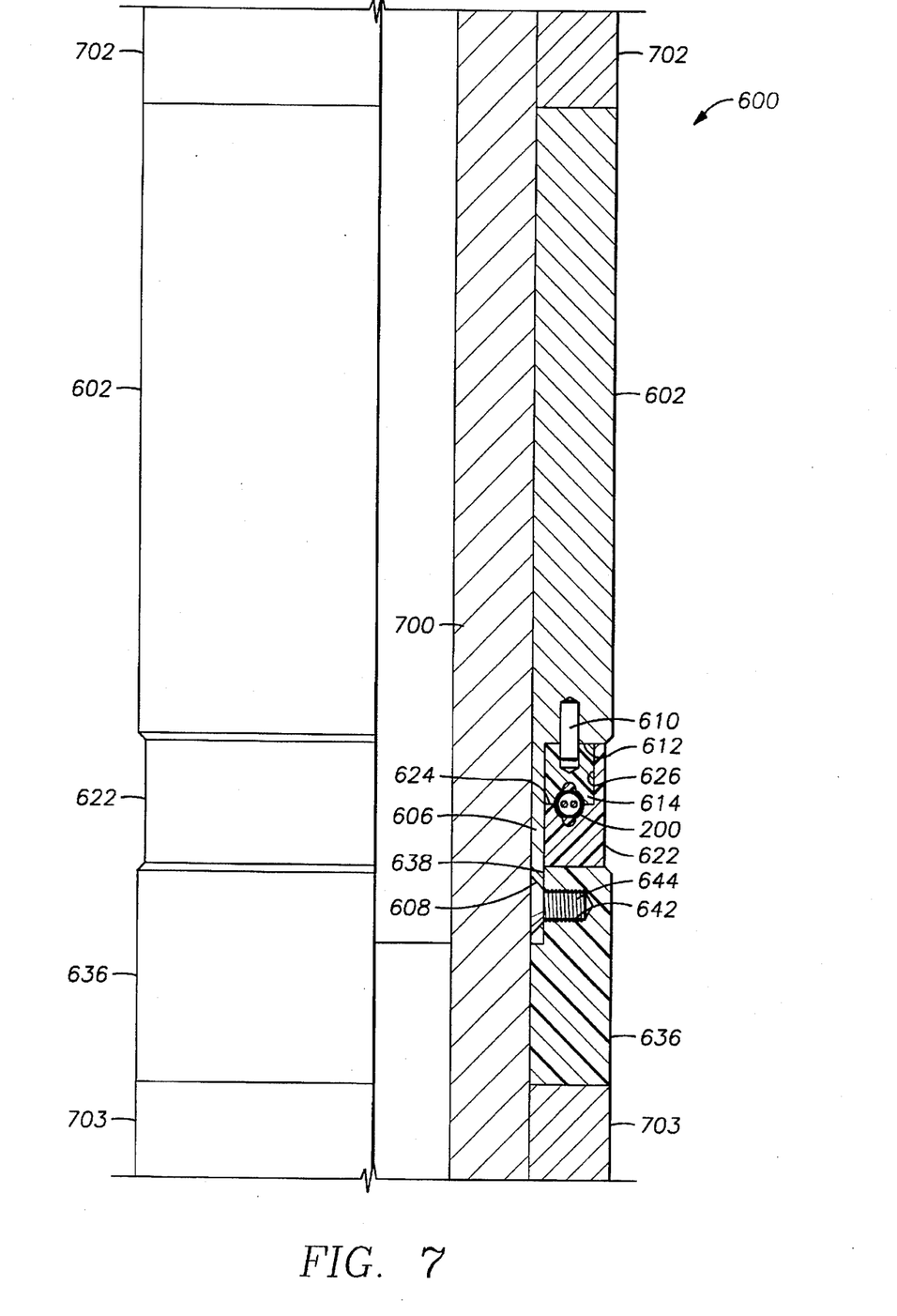
FIG. 7 is a partially cutaway side view illustrating the antenna assembly 600 connected to a mandrel 700 in accordance with the invention.

When the antenna assembly 600 is operated downhole, the components of the assembly 600 are interconnected as shown in FIG. 7. The antenna assembly 600 is positioned concentrically about a mandrel 700, in locking engagement therewith. The assembly 600 may be locked to the mandrel 700, for example, using fasteners (not shown) affixed to the mandrel 700, which latch to corresponding features of the antenna body 602 and end ring 636. To form a downhole string of uniform diameter, the assembly 600 may abut with other sleeve sections 702–703 that surround the mandrel 700.

ALTERNATIVE EMBODIMENT

An alternative embodiment of the antenna 200 is also contemplated in accordance with the invention. This embodiment includes the wire 208; however, the tube 202, epoxy, adapter-connector 210, and sealant layer 400 are not used. Instead of the tube 202, epoxy, and sealant layer 400, a jacket (not shown) is formed in a generally round shape around the wire 208 to sheath, protect and hermetically seal the wire 208. The jacket also includes features to perform the functions of the epoxy, adapter-connecter 210. In particular, the jacket includes an extension, which may comprise a finger that extends from the wire 208. The extension includes connecting terminals which may comprise side-byside terminals or a coaxial connector, for example. To provide an adequate seal between the jacket and a mating connector, the extension may include a sealing member like the pressure resistant seal 212.

In an illustrative embodiment, the jacket may comprise a material that is malleable in an uncured or heated state, such as plastic. In a preferred embodiment, a thermosetting resin such as a phenolic chemical may be used.

Such an antenna may be manufactured, in an illustrative embodiment, by performing a number of steps. First, the wire 208 is wound to provide the desired diameter and number of coils. The wire 208, like the embodiments described above, is preferably insulated. Then the wire 208 is attached to a desired set of electrical terminals, such as those discussed above. Then, in a preferred embodiment, the wire 208 is positioned in a suitable injection mold, the pieces of the mold are closed together, and the desired jacket material is injected into the mold, filling it. After the jacket material cures and cools, the jacket is removed from the mold, and any seams on the jacket are trimmed. Then, the jacket extension may be machined as needed to receive the sealing member. In an exemplary embodiment, where the sealing member comprises an o-ring, the jacket extension may be machined to define an annular recess to receive the o-ring. The o-ring may then be stretched over the jacket extension and slid into the annular recess. In an alternative embodiment, the jacket may be formed using a transfer mold rather than an injection mold.

CONCLUSION

The present invention provides its users with a number of distinct advantages. For example, the invention provides a modular antenna that is easily installed or replaced. This avoids certain problems with prior arrangements, such as the time and expense typically required to remove the filler 106 and the dielectric material 108, and to unwind the wire 100. In particular, the antenna 200 of the present invention may be easily removed by separating the sleeve sections 306a–b, disconnecting the mandrel 302 from one of its adjacent mandrels, and sliding the antenna 200 over the end of the mandrel 302. In the embodiment of FIGS. 6–7, the antenna 200 may be removed in a similar fashion, or the entire antenna assembly 600 may be removed as a unit. In addition to its convenient removal, the antenna 200 of the invention may be installed or replaced just as easily.

The antenna 200 of the invention is also advantageous since it resists damage to the wire 200 from wellbore fluids, due to sealing features such as the sealant layer 400 and the pressure resistant seal 212. Additionally, the antenna 200 is resistant to high pressures often encountered-downhole, due in part to the filler that resides in the tube 202.

While there have been shown what are presently considered to be preferred embodiments of the invention, it will be apparent to those skilled in the art that various changes and modifications can be made herein without departing from the scope of the invention as defined by the appended claims.

What is claimed is:

1. A removable, sealed, antenna module, comprising:

(a) a tube formed in a generally circular shape and including a first end and a second end positioned adjacent to each other to define a coupling gap between the first and second ends, said tube forming the body of the module;

(b) a length of insulated conductive wire extending through the tube to form one or more coils;

(c) an adapter-connector joined to the tube and including conductive terminals electrically connected to the wire; and (d) a module sealant layer surrounding and hermetically sealing said tube, said coupling gap, and said junction between the adapter-connector and the tube.

2. The antenna of claim 1, further including filler residing in the tube.

3. The antenna of claim 2, wherein the wire forms multiple coils, and the filler electrically insulates the coils from each other.

4. The antenna of claim 2, wherein the filler comprises a pressure resistant material.

5. The antenna of claim 2, wherein the filler comprises an epoxy material.

6. The antenna of claim 1, wherein the tube forms a circle.

7. The antenna module of claim 1, wherein the module sealant layer includes one or more external ridges.

8. The antenna module of claim 1, wherein the module sealant layer includes one or more external indentations.

9. The antenna of claim 1, further comprising a downhole tool, including a mandrel surrounded by the module, and also including sleeve sections positioned around the mandrel and movable along the mandrel to securely house the module.

10. The antenna of claim 1, wherein the adapter-connector and the tube are formed as a unitary piece.

11. The antenna of claim 1, wherein the tube defines a wall opening, and ends of the wire pass through the wall opening to electrically connect to the adapter-connector.

12. The antenna of claim 1, wherein the adapter-connector includes a pressure resistant seal.

13. A removable sealed antenna module for use in a downhole toolstring, comprising:

(a) plural tubes formed in generally semicircular arcs positioned substantially end-to-end to define multiple coupling gaps between the ends, the tubes forming said module, said module conforming to said downhole tool string;

(b) a length of conductive wire extending through the tubes to form one or more coils;

(c) an adapter-connector joined to one of the tubes and including conductive terminals electrically connected to the wire; and (d) a module sealant layer surrounding and hermetically sealing the tubes, the coupling gaps, and the junction between the adapter-connector and its respective tube.

14. The antenna of claim 13, further including a filler residing in the tubes.

15. The antenna of claim 14, wherein the wire forms multiple coils, and the filler electrically insulates the coils from each other.

16. The antenna of claim 14, wherein the filler comprises a pressure resistant material.

17. The antenna of claim 14, wherein the filler comprises an epoxy material.

18. The antenna of claim 13, wherein the tubes form a circle.

19. The antenna of claim 13, wherein the module sealant layer includes one or more external ridges formed thereon.

20. The antenna of claim 13, wherein the module sealant layer defines one or more external indentations.

21. The antenna of claim 13, further comprising a downhole tool, including a mandrel surrounded by the tubes and the wire, and also including sleeve sections positioned around the mandrel and movable along the mandrel to securely house the tubes.

22. The antenna of claim 13, wherein one of the tubes defines a wall opening, and ends of the wire pass through the wall opening to electrically connect to the adapter-connector.

23. The antenna of claim 13, wherein the adapter-connector includes a pressure resistant seal.

24. An antenna assembly for use in a well, comprising:

a mandrel for use in a downhole string;

a generally circular, removable, sealed antenna module located around the mandrel, said antenna module including an adapter-connector; plural sleeve sections concentrically encasing the mandrel, and means for selectively enclosing and securing antenna module, one of said sleeve sections including a mating connector to attachably connect to the adapter-connector.

25. The antenna assembly of claim 24, wherein the mating connector is electrically connected to an electrical circuit housed in one of the sleeve sections.

26. The antenna assembly of claim 24, wherein the mating connector is electrically connected to an electrical circuit housed in the mandrel.

27. The antenna assembly of claim 24, wherein the mating connector is electrically connected to a coaxial cable to relay electrical signals between the antenna and remotely located electrical equipment.

28. A removable sealed downhole antenna module comprising:

a length of insulated conductive wire including wire ends, said wire being formed in a generally circular shape to form one or more coils; and a jacket formed about the coils to sheath and hermetically seal the wire and coils, said jacket including a unitary extension with electrical terminals electrically connected to the wire ends.

29. The antenna of claim 28, wherein the antenna forms a circle.

30. The antenna of claim 28, wherein the jacket includes one or more external ridges.

31. The antenna of claim 28, wherein the jacket defines one or more external indentations.

32. The antenna of claim 28, further comprising a downhole tool, including a mandrel surrounded by the wire, and also including sleeve sections positioned around the mandrel and movable along the mandrel to securely house the antenna.

33. The antenna of claim 28, wherein the extension includes a pressure resistant seal.

* * * * *